(12) United States Patent
Kuhn et al.

(10) Patent No.: US 10,011,280 B2
(45) Date of Patent: Jul. 3, 2018

(54) METHOD OF OPERATING A POWER PATH WITH CONTINUOUSLY POWER-SPLIT TRANSMISSION AND WITH SECONDARILY COUPLED POWER SPLIT

(71) Applicant: ZF Friedrichshafen AG, Friedrichshafen (DE)

(72) Inventors: Jan-Frederik Kuhn, Friedrichshafen (DE); Marcus Hiemer, Meckenbeuren (DE); Stephan Schinacher, Egesheim (DE); Sven Bieber, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/360,218

(22) Filed: Nov. 23, 2016

(65) Prior Publication Data

US 2017/0174217 A1    Jun. 22, 2017

(30) Foreign Application Priority Data

Dec. 17, 2015   (DE) .................. 10 2015 225 527

(51) Int. Cl.
*F16H 59/34*   (2006.01)
*F16H 61/66*   (2006.01)
(Continued)

(52) U.S. Cl.
CPC ...... *B60W 30/18054* (2013.01); *B60W 10/02* (2013.01); *B60W 10/103* (2013.01);
(Continued)

(58) Field of Classification Search
CPC ............... B60W 10/02; B60W 10/103; B60W 2550/142; B60W 2710/021; B60W 2710/1005; B60W 2510/104; B60W 2540/16; B60W 2710/1038; B60W 30/18054; F16D 2500/50841; F16D 2500/10412; F16D 2500/1087;
(Continued)

(56) References Cited

U.S. PATENT DOCUMENTS 5,452,946 A * 9/1995 Warner ................... B60T 7/122
                                                      303/24.1
2012/0088629 A1* 4/2012 Aoyama ............... B60W 10/02
                                                         477/39

FOREIGN PATENT DOCUMENTS

DE    10 2013 200 392 A1    7/2014
DE        102014204902 A1 *  9/2015    ......... F16H 61/0403

* cited by examiner

*Primary Examiner* — Ramya P Burgess
*Assistant Examiner* — Lillian T Nguyen
(74) *Attorney, Agent, or Firm* — Davis & Bujold PLLC; Michael J. Bujold

(57) ABSTRACT

A method for operating a vehicle drive-train having a continuously power-branched transmission with secondary coupling. In the open operating condition of reversing clutches of a reversing gear unit, torque applied in the area of a drive output can be supported by a range group in the area of a variator. In the event of a command to interrupt the power flow between a drive engine and the drive output, it is checked whether the vehicle is on an inclined surface and if the result of that inquiry is positive, the power flow between the drive engine and the transmission is interrupted at the latest when the rotational speed of the drive output is reduced to zero by opening the reversing clutches, while the active connection between the drive output and the variator is maintained by way of the range group.

8 Claims, 6 Drawing Sheets

(51) Int. Cl.
  *F16H 59/70* (2006.01)
  *F16H 61/02* (2006.01)
  *F16H 61/42* (2010.01)
  *B60W 30/18* (2012.01)
  *B60W 10/02* (2006.01)
  *B60W 10/103* (2012.01)
  *F16D 48/06* (2006.01)
  *F16H 61/70* (2006.01)
  F16H 47/04 (2006.01)
  F16H 59/66 (2006.01)

(52) U.S. Cl.
  CPC ............ *F16D 48/06* (2013.01); *F16H 61/702* (2013.01); *B60W 2510/104* (2013.01); *B60W 2540/16* (2013.01); *B60W 2550/142* (2013.01); *B60W 2710/021* (2013.01); *B60W 2710/1005* (2013.01); *B60W 2710/1038* (2013.01); *F16D 2500/1087* (2013.01); *F16D 2500/10412* (2013.01); *F16D 2500/30808* (2013.01); *F16D 2500/30825* (2013.01); *F16D 2500/3124* (2013.01); *F16D 2500/50841* (2013.01); *F16H 47/04* (2013.01); *F16H 2059/663* (2013.01)

(58) Field of Classification Search
  CPC . F16D 2500/30808; F16D 2500/30825; F16D 2500/3124
  See application file for complete search history.

METHOD OF OPERATING A POWER PATH WITH CONTINUOUSLY POWER-SPLIT TRANSMISSION AND WITH SECONDARILY COUPLED POWER SPLIT

This application claims priority from German patent application serial no. 10 2015 225 527.1 filed Dec. 17, 2015.

FIELD OF THE INVENTION

The invention concerns a method for operating a drive-train of a vehicle having a continuously power-branched transmission with secondary.

BACKGROUND OF THE INVENTION

Mobile working machines are also used in work environments characterized by steep uphill and downhill inclinations. During this, transport vehicles are loaded by mobile working machines, for example even on an inclined surface. In most cases transport vehicles are loaded by means of wheel loaders, which comprise a corresponding working hydraulic system for the purpose. During the loading process, for example a scoop filled with the material to be loaded has to be raised in order to reach a load container of a transport vehicle at a certain height, into which the material is discharged. Loading involves continual travel direction changes along with low travel speeds, in order to reach in each case the optimum unloading position for the wheel loader.

In working machines a travel direction is often specified with the help of a so-termed steering column switch, which has at least three detent positions, namely for forward driving, driving in reverse and for a so-termed neutral operating condition of the vehicle drive-train of such a working machine. When the neutral operating condition is called for, the power flow between the drive engine and the drive output of a mobile working machine is interrupted.

As a rule, the detent position corresponding to the neutral operating condition is located between the detent positions for driving forward and driving in reverse. As a result, actuation of the steering column switch starting from the detent position for forward or reverse driving, in the direction toward the detent position for reverse or forward driving, respectively, has to pass through the detent position of the steering column switch for the neutral operating condition. Below a defined actuation speed of the steering column switch the dwell-time of the steering column switch in the detent position for the neutral operating condition is consequently too long, so that, whether he wants to or not, the driver will emit a command for the neutral operating condition to a transmission of the vehicle drive-train of a mobile working machine and the power flow between the drive engine and the drive output of the mobile working machine is interrupted in the area of the transmission by a corresponding actuation of the transmission.

If such a neutral request or command to set the neutral operating condition of a vehicle drive-train of a mobile working machine occurs while the working machine is on an inclined surface, the vehicle or mobile working machine may roll away, and if this happens when the working hydraulic system is in the raised position with the scoop full, the working performance of the mobile working machine is impeded, which is therefore undesirable.

From DE 10 2013 200 392 A1 a method is known for the operation of a vehicle drive-train having a drive engine with a continuously power-branched transmission and with a drive output. The transmission consists of a reversing gear unit, a planetary gearset and a range group. The reversing gear unit comprises reversing clutches with which the rotational direction of the transmission is switched and which, together with the range clutches, establish the power flow between the drive engine and the drive output. In the area of the planetary gearset the force or power flow from the drive engine is divided into a mechanical and a hydrostatic power fraction. By way of the range group the maximum drive output rotational speed can be increased and the power flow is established between the variator and the drive output and also between the drive output and the reversing gear unit.

When a command to engage the neutral operating condition is issued, both the reversing clutches of the reversing gear unit and the shifting elements of the range group are changed to the open operating condition, in order to interrupt the power flow in the area between the drive engine and the transmission input and also between the variator and the drive output.

However, this procedure leads disadvantageously to the result that when it is on an incline and especially if an unwanted command to engage the neutral operating condition occurs, a mobile working machine built with the continuously power-branched transmission, will roll away to an undesired extent unless at the same time the driver actuates a service brake of the working machine.

SUMMARY OF THE INVENTION

Accordingly, the purpose of the present invention is to provide a method for operating a vehicle drive-train having a continuously power-branched transmission, by means of which method undesired rolling away during a travel direction change while on an inclined surface is avoided.

According to the invention, this objective is achieved by a method having the characteristics as described below.

In the method according to the invention for operating a vehicle drive-train having a continuously power-branched transmission with secondary coupling, which comprises a reversing gear unit, a planetary gearset, a range group and a variator, by means of the reversing clutches of the reversing gear unit, the rotational direction of the transmission can be changed and a power flow between the transmission and a drive engine can be established. In the planetary gearset, torque provided by the drive engine can be applied in the area of a drive output of the vehicle drive-train connected to the transmission, by way of a first power path and a second power path containing the variator, and also by way of shifting elements of the range group. In the open operating condition of the reversing clutches of the reversing gear unit, torque applied in the area of the drive output can be assisted by the range group in the area of the variator when the power flow between the drive output and the variator is established in the range group by means of range clutches.

According to the invention, when there is a command to interrupt the power flow in the vehicle drive-train between the drive engine and the drive output, it is checked whether the vehicle, built with the vehicle drive-train, is on an inclined surface. If the answer to that inquiry is positive, the power flow between the drive engine and the transmission is interrupted by opening the reversing clutches, at the latest when a drive output rotational speed equal to zero is reached, while the active connection between the drive output and the variator is maintained by way of the range group.

By means of the procedure according to the invention, when it is on an inclined surface and at the same time when a neutral operating condition of the vehicle drive-train or transmission has been called for while the power flow between the drive engine and the drive output has been interrupted, a mobile working machine built with the above-described drive-train can be prevented from rolling away in a simple manner by decoupling the drive engine from the drive output in the area of the reversing gear unit and at the same time maintaining an active connection that holds the drive output rotationally fixed, between the drive output and the variator by appropriate actuation of the range group.

When the answer to the inquiry is positive, i.e. if it is determined that a mobile working machine built with the vehicle drive-train is on an inclined surface, then if the rotational speed of the drive output while there is a power flow between the drive engine and the drive output is displaced toward zero by adjusting the transmission ratio of the variator, and when the rotational speed of the drive output is lower than a threshold value, the power flow between the drive engine and the drive output is interrupted by actuating the reversing clutches of the reversing gear unit whereas the power flow between the variator and the drive output is maintained by means of the range group, the braking of the drive output in the direction toward bringing the vehicle to rest is first assisted by the drive engine still actively connected to the drive output, and unacceptable rotational speeds in the area of the variator are avoided in a simple manner.

In an advantageous variant of the method according to the invention, the transmission ratio of the variator is adjusted until the rotational speed of the drive output is lower than the threshold value, whereby rolling away of a mobile working machine which is built with the vehicle drive-train and is on an inclined surface is reliably avoided.

If the threshold value of the drive output rotational speed is at least approximately equal to zero, then any loads occurring in the area of the variator are minimal.

In a variant of the method according to the invention characterized by little actuation effort, when the result of the inquiry is positive the power flow between the drive engine and the drive output is interrupted by actuating the reversing clutches of the reversing gear unit, while by adjusting the transmission ratio of the variator the rotational speed of the drive output is displaced in the direction toward zero and the power flow between the variator and the drive output is maintained by way of the range group.

If the result of the inquiry to check whether a vehicle built with the drive-train is on an inclined surface is negative, then in a further advantageous variant of the method according to the invention which only loads the variator to a small extent, both the power flow between the drive engine and the drive output in the area of the reversing gear unit and also the power flow between the drive output and the variator is interrupted in the area of the range group.

To determine an inclined position, in a further variant of the method according to the invention which can be carried out simply, signals from an inclination sensor, such as an acceleration sensor, a rotational speed sensor or combinations of these sensors are evaluated.

Both the characteristics indicated in the claims and those described in the following example embodiments of the object of the invention, whether taken in isolation or in any combination with one another, are suitable for developing the object of the invention further.

BRIEF DESCRIPTION OF THE DRAWINGS

Further advantages and advantageous embodiments of the object of the invention emerge from the claims and from the example embodiment whose principle is described below with reference to the drawings, which show:

DETAILED DESCRIPTION OF THE PREFERRED EMBODIMENTS

Figure 1:
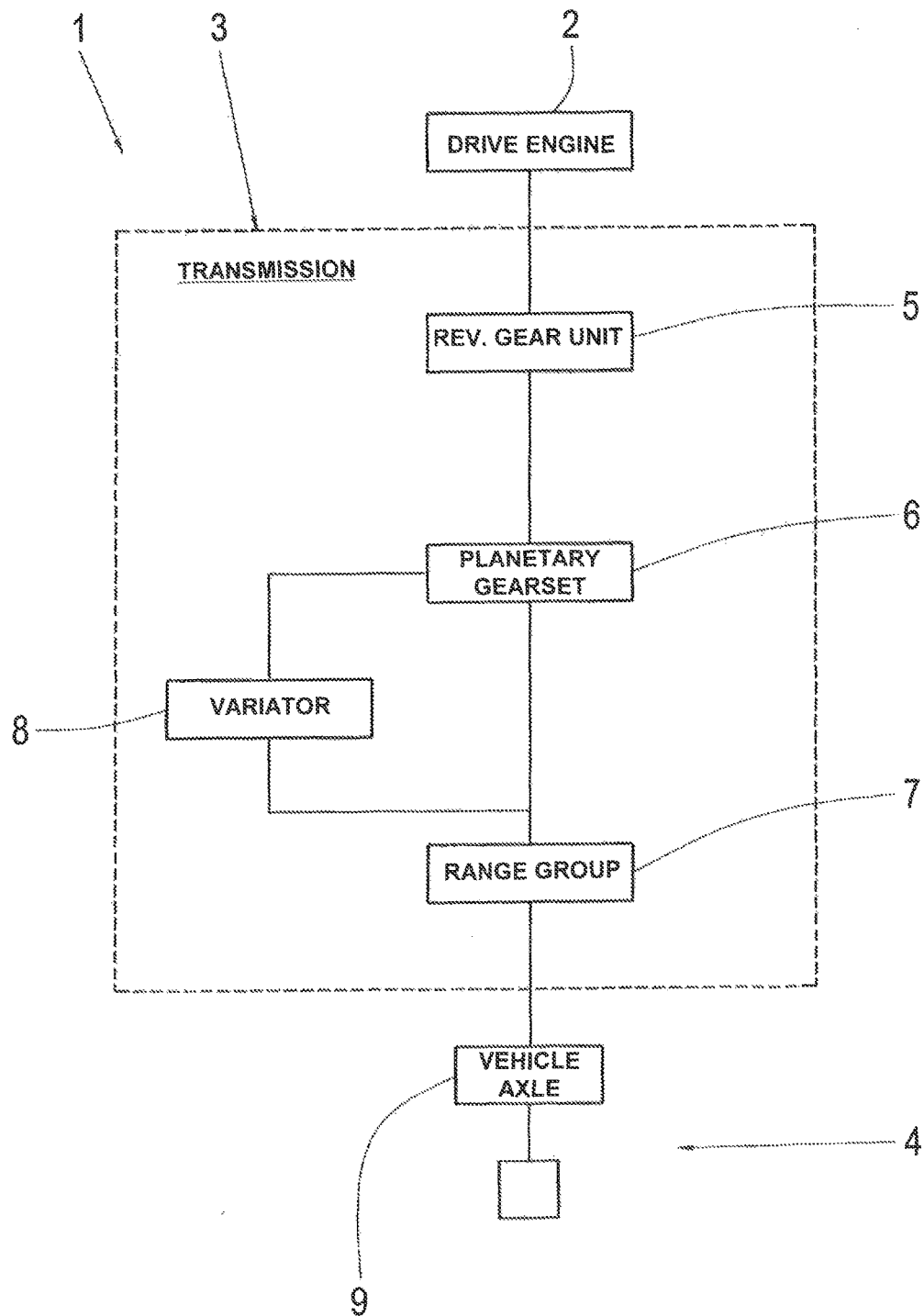
FIG. 1: A block diagram of a vehicle drive-train of a mobile working machine.

FIG. 1 shows a block diagrammatic representation of a vehicle drive-train 1 of a vehicle preferably designed as a mobile working machine, with a drive engine 2, a continuously power-branched transmission 3 with secondary coupling, and with a drive output 4. The transmission 3 comprises a reversing gear unit 5, a planetary gearset 6, a range group 7 and a variator 8, in this case in the form of a hydrostat.

Figure 2:
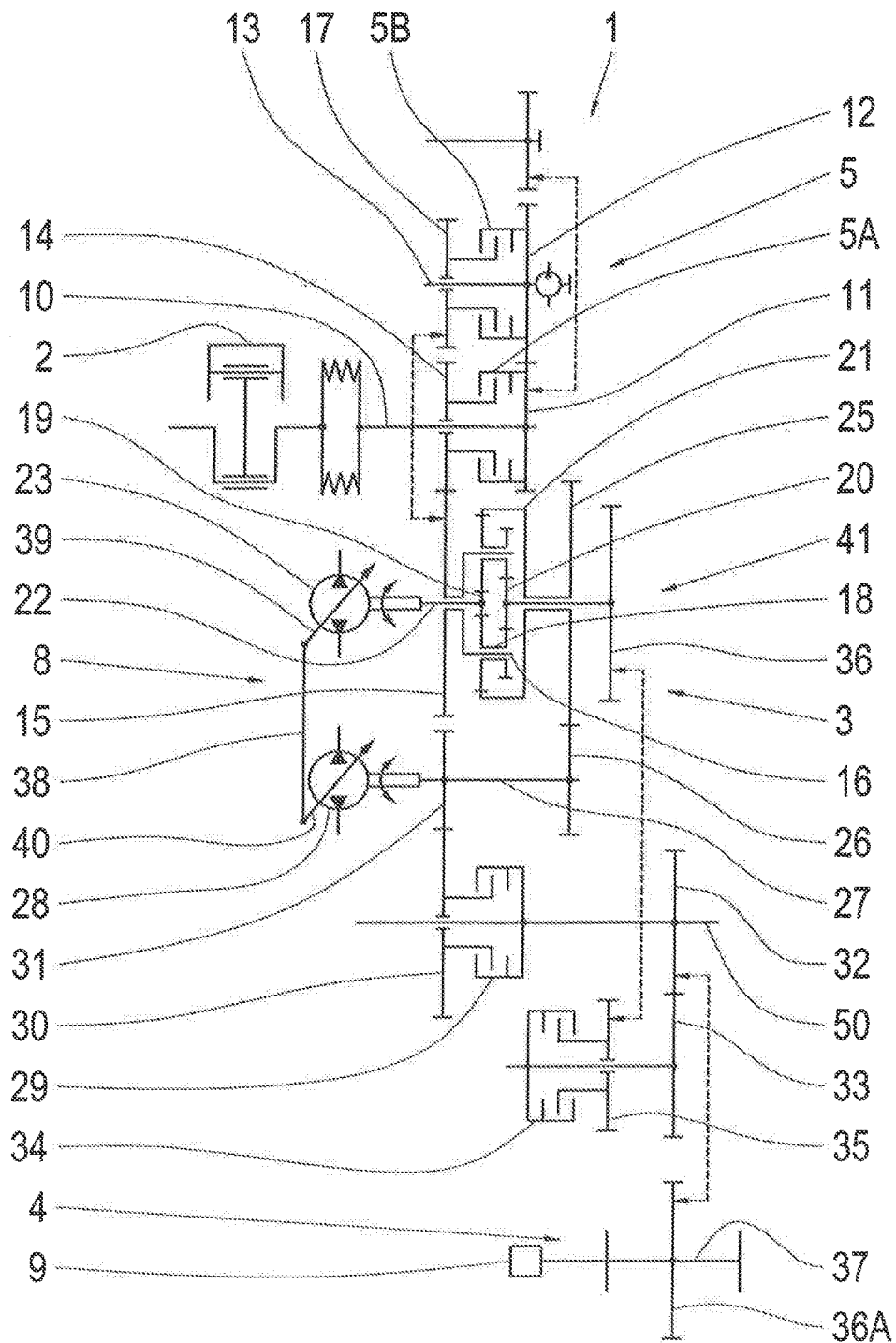
FIG. 2: A detailed representation of the vehicle drive-train according to FIG. 1.

FIG. 2 shows a more detailed representation of a vehicle drive-train 1 having the structure shown in FIG. 1, such that it emerges from the representation in FIG. 2 that the reversing gear unit 5 is made with two reversing clutches 5A, 5B in the form of frictional shifting elements. In this case the drive engine is an internal combustion engine, preferably a diesel engine, and can in other embodiments of the vehicle drive-train also be an electric machine or a combination of an internal combustion engine of any type and an electric machine.

The reversing clutches 5A and 5B of the reversing gear unit 5 are each designed as travel direction clutches. In other words, when the frictional shifting element 5A is closed, drive rotational movement of the drive engine 2 is introduced into the transmission 3 with a rotational direction such that a vehicle built with the vehicle drive-train 1 is driven in the forward travel direction. On the other hand, if the frictional shifting element 5B is closed and at the same time the frictional shifting element 5A is open, the drive rotational movement from the drive engine 2 is introduced into the transmission 3 with the opposite rotational direction and a vehicle with the vehicle drive-train 1 is driven in reverse.

A shaft 50 of the transmission 3 is actively connected to the drive output 4 of the vehicle drive-train 1, by way of which a drivable vehicle axle 9 can be acted upon by torque. In the area of the continuously power-branched transmission 3, by engaging and disengaging various mechanical power paths in the transmission 3 a number of transmission ratio ranges can be obtained, within which, in turn, the transmission ratio of the transmission 3 can be varied continuously by adjusting the stroke volumes of hydraulic machines 23, 28 of the hydraulic variator 8 of a hydraulic power path of the transmission 3.

A power flow between the drive engine 2 and the drive output 4 can be produced in the area of the frictional shifting element 5A or of the frictional shifting element 5B by correspondingly adjusting the transmission capacity of the shifting elements 5A, 5B. When a start is commanded, in the area of the transmission 3 a starting transmission ratio is set and drive torque from the drive engine 2 is passed on in correspondingly converted form toward the drive output 4 or drivable vehicle axle 9 via the transmission 3 as soon as the power flow has been at least partially established.

A transmission input shaft 10 of the transmission 3 is connected in a rotationally fixed manner to the drive engine 2. By way of a fixed wheel 11 and a fixed wheel 12 the transmission input shaft 10 drives an auxiliary power take-off 13 and first shifting element halves of the frictional shifting elements 5A and 5B. The frictional shifting element 5A is arranged coaxially with the transmission input shaft 10, whereas the frictional shifting element 5B or travel direction clutch for reverse driving is positioned on the shaft of an auxiliary power take-off 13, this shaft being coaxial with the transmission input shaft 10. In the closed operating condition of the frictional shifting element 5A or travel direction clutch for forward driving, via a loose wheel 14 mounted to rotate on the transmission input shaft 10 the transmission input shaft 10 drives a loose wheel 15 which is coupled in a rotationally fixed manner to a planetary carrier 16 of the planetary gearset 6 which constitutes a power-branching unit. In the closed operating condition of the frictional shifting element 5B, the transmission input shaft 10 drives the loose wheel 15 by way of a loose wheel 17.

On the planetary carrier 16 are mounted to rotate a plurality of double planetary wheels 18. The double planetary wheels 18 engage with a first sun gear 19 and a second sun gear 20, and also with a ring gear 21. The first sun gear 19 is connected rotationally fixed to a shaft 22 of a first hydraulic machine 23 of a variator 8. The ring gear 21 is in active connection with a shaft 27 of the second hydraulic machine 28 of the variator or hydrostatic unit 8 by way of a fixed wheel 25 and a fixed wheel 26.

The shaft 50 of the transmission 3 can be connected by way of a frictional shifting element 29 for the first transmission ratio range of the transmission 3, a loose wheel 30 and a fixed wheel 31, to the second shaft 27 of the variator 8 or hydrostatic unit, so that the last-described gear set, with the fixed wheel 26 and the fixed wheel 25 that meshes with it, as well as the ring gear 21, form the first mechanical power path in the transmission and is part of the range group 7. Furthermore the shaft 50 can be coupled, by way of a fixed wheel 32, a fixed wheel 33 and a further frictional shifting element 34 or range clutch of the range group 7 for the second transmission ratio range of the transmission 3 and a loose wheel 35 and a fixed wheel 36, to the second sun gear 20 so that this gear set corresponds to the second mechanical power path of the transmission 3.

The fixed wheel 36 is arranged coaxially with the second sun gear 20, whereas the fixed wheel 33, the frictional shifting element 34 for the second driving range and the loose wheel 35 are arranged coaxially with one another. The fixed wheel 32, the frictional shifting element 29 for the first driving range and the loose wheel 30 are in turn positioned coaxially with the shaft 50. In addition, the fixed wheel 32 meshes both with the fixed wheel 33 and also with a fixed wheel 36A of a transmission output shaft 37, which in turn can be connected to the drivable vehicle axle 9 or to a plurality of drivable vehicle axles 9 of the vehicle drive-train 1.

The travel direction clutches 5A and 5B are in this case in the form of wet clutches, which are provided not only for establishing the power flow between the drive engine 2 and the drive output 4, but at the same time, to determine their travel direction as described earlier. In accordance with their capacitive design the frictional shifting elements 5A and 5B of the vehicle drive-train 1 according to FIG. 2 can also be used as starting elements. This is the case when, starting from a neutral operating condition of the transmission 3 in which the range clutches or shifting elements 29 and 34 are open, a driver engages a travel direction and at the same time actuates an accelerator pedal in order to indicate a desire for speed. In the present case the frictional shifting elements 5A and 5B are designed in such manner that they also enable a travel direction change or so-termed reversing process starting from higher travel speeds in the forward and reverse travel directions.

During such a reversing process a vehicle speed is first reduced from the vehicle speed at the time toward zero, and for this both the transmission capacity of the frictional shifting element 5A and also the transmission capacity of the frictional shifting element 5B are adjusted to an appropriate extent. During the reversing process the two frictional shifting elements 5A and 5B are predominantly operated with slip. If the vehicle speed is essentially equal to zero, the transmission capacities of the two shifting elements 5A and 5B are adjusted in such manner that the vehicle moves in the direction opposite to the previous travel direction until the required vehicle speed has been reached.

Basically, in the transmission 3 represented in FIG. 2, torque from the drive engine 2 is transmitted toward the drive output 4 by way of the power-branching unit or planetary gearset 6, in part by way of the mechanical power path of the range group 7 currently engaged in order to obtain the engaged first or second transmission ratio range, and in another part by way of the hydraulic power path of the transmission 3. In this case the hydraulic power path comprises the first sun gear 19, the first shaft 22 of the variator 8, the variator 8 itself and the second shaft 27 of the variator 8.

To be able to carry out a starting process within short operating times and essentially without delay, starting when the vehicle is at rest and the transmission 3 is in the neutral operating condition, the shifting element 29 or the range clutch of the first transmission ratio range of the transmission 3 is closed and in addition the shifting element 5A or the shifting element 5B, depending on the driver's wish at the time to drive forward or in reverse, is changed to its closed operating condition. During the engagement of the shifting element 29 and the shifting element 5A or 5B, the hydraulic machines 23 and 28 are displaced by means of an adjustable yoke 38 in such manner that in the area of the transmission 3 the desired starting transmission ratio is produced. For this the transmission capacity of the frictional shifting element 5A or 5B is set to values greater than zero during the setting of the starting transmission ratio of the transmission 3, in order to be able to start a vehicle built with the drive-train 1 according to FIG. 2 already during the process of closing the frictional shifting element 5A or 5B.

During such a starting process of the vehicle drive-train 1, the drive-train is operating in traction with the first hydraulic machine 23 operating as a pump and the second hydraulic machine 28 as a motor. By virtue of an actuation of the yoke 38 to be described in more detail below, in order to accelerate the vehicle built with the drive-train 1, axes 39, 40 of the hydraulic machines 23 and 28 are displaced in such manner that the transmission ratio of the transmission 3 is reduced and a drive output speed increases. With increasing swivel angle of the axes 39 and 40 toward a maximum swivel angle, in this case approximately 44°, and provided that the driver still wishes to continue accelerating and increasing the speed of the vehicle some more, for a further continuous variation of the transmission ratio of the transmission 3, the second transmission ratio range must be engaged in the area of the transmission 3. For this, the shifting element 29 must be disengaged and the further frictional shifting element 34 changed to its closed operating condition. At a defined swivel angle of the axes 39 and 40, the frictional shifting elements 29 and 34 are essentially simultaneously in a synchronous operating condition, so that the change between the first transmission ratio range and the second transmission ratio range can be carried out substantially without traction force interruption.

If in the transmission 3 the second transmission ratio range is engaged, in which the frictional shifting element 34 is closed and the frictional shifting element 29 is open, then the first hydraulic machine 23 is operated as a motor and the second hydraulic machine 28 as a pump. The two axes 39 and 40 of the hydraulic machines 23 and 28 are together swiveled by the yoke 38, starting from the current swivel position, i.e. the maximum swivel angle, back toward the initial position at the beginning of the starting process, so that by swiveling the hydrostatic unit 34 the complete extent of the second transmission ratio range can be covered. The result is that the speed of the vehicle built with the drive-train 1 increases further until the maximum vehicle speed has been reached.

The transmission 3 of the drive-train 1 according to FIG. 1 or 2 has the property that when the range group 7 is closed, i.e. when the frictional shifting element 29 or 34 is closed but the reversing gear unit 5 is open, which is in the open operating condition when the shifting elements 5A and 5B are open at the same time, although the power flow between the drive engine 2 and the drive output 4 is interrupted the drive output 4 can be supported in the area of the variator 8. In that case the pressure between a high-pressure and a low-pressure oil duct of the hydrostat 8 made in the form of an axial piston machine increases when a drive output torque is imposed by means of the shaft 27 or the shaft 22 of the variator 8. Apart from leaks in the variator 8, with such a clutch connection of the range group 7 the transmission output shaft 37 or an output shaft actively connected thereto does not begin to move when a drive output torque is imposed, for example because the vehicle is on an inclined surface.

Figure 3:
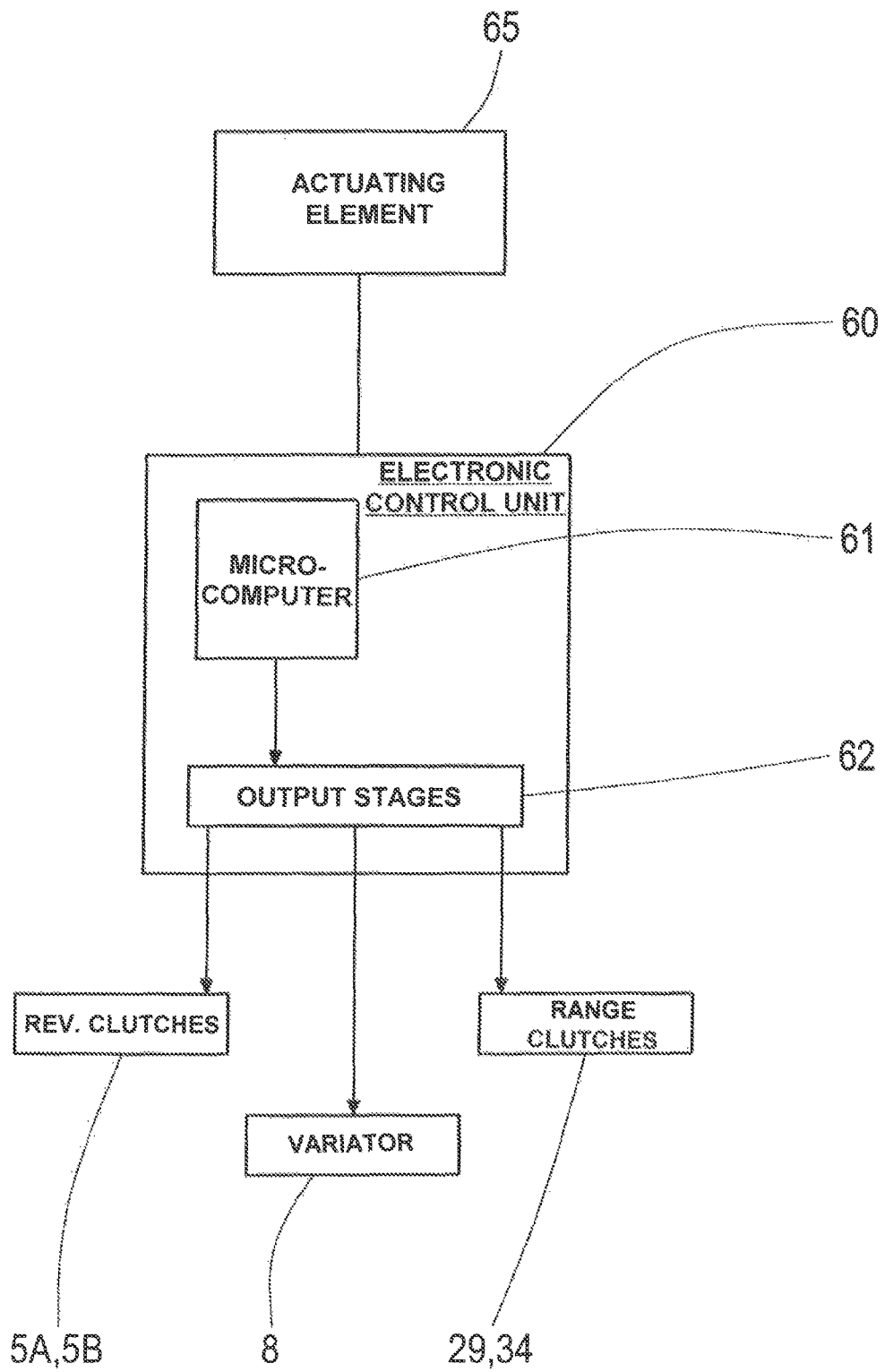
FIG. 3: A block diagram of an electronic control system of the vehicle drive-train according to FIGS. 1 and 2.

The connection of the reversing clutches 5A and 5B of the reversing gear unit 5 and of the range clutches 29 and 34 of the range group 7 takes place by means of control currents which are determined by an electronic control unit 60 shown in more detail in FIG. 3, in a microcomputer 61 such as a microcontroller, a DSP (Digital Signal Processor), a FPGA (Field Programmable Gate Array) and the like. The microcomputer 61 passes nominal currents to output stages 62 which, for their part, close actuators that change the condition of the reversing clutches 5A and 5B and the range clutches 29 and 34 to an open, closed or slipping operating condition. In addition, in the area of the microcomputer 61 it is determined into which position the variator or hydrostat unit 8 has to be swiveled. In this way the rotational speed of the transmission output shaft 37 or of a drive output shaft connected thereto, and hence the vehicle speed, can be varied.

Figure 4:
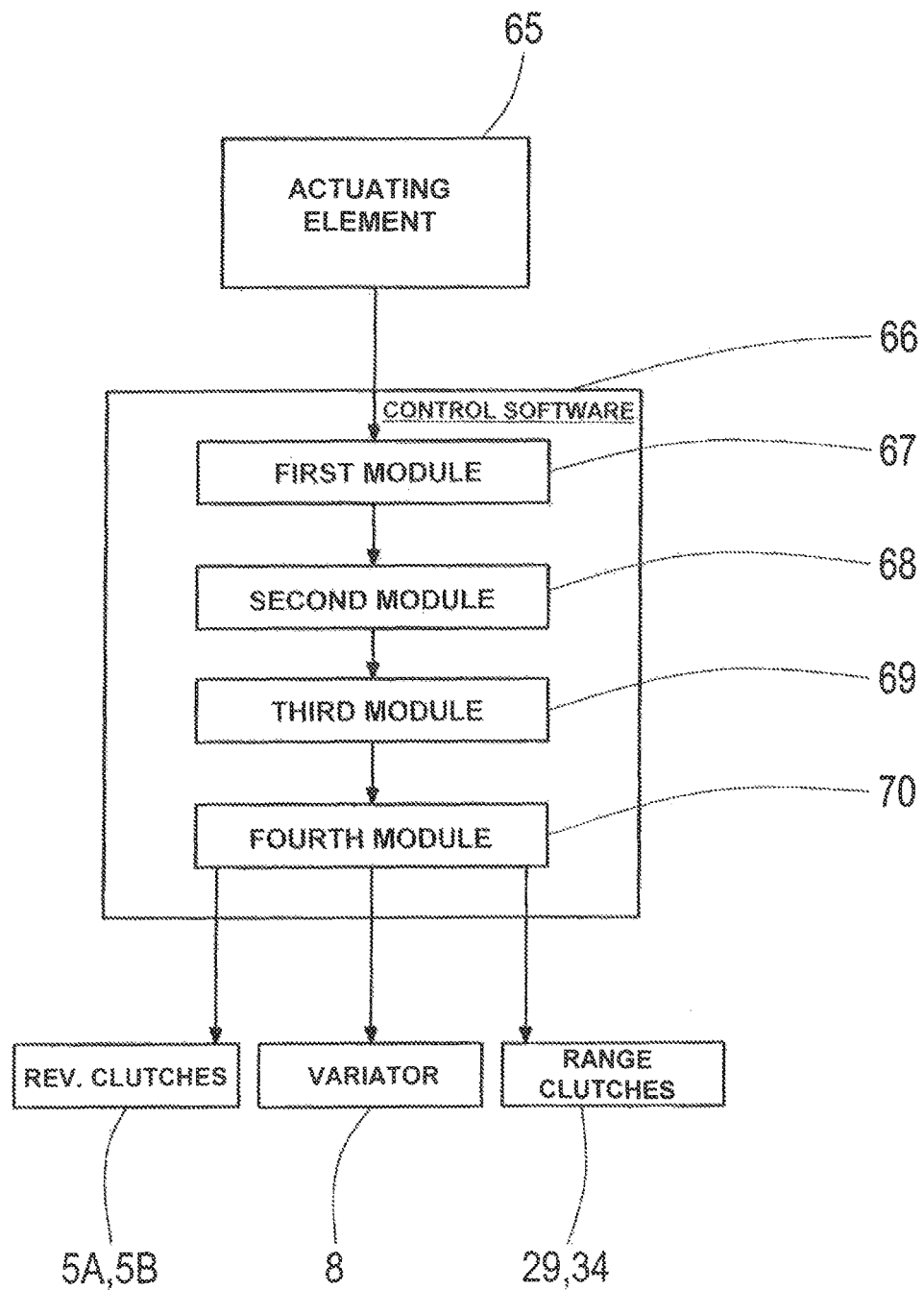
FIG. 4: A block diagrammatic representation of a functional sequence plan during the actuation of the vehicle drive-train according to FIGS. 1 and 2.

FIG. 4 shows a functional sequence plan for the operation of the vehicle drive-train 1 according to FIGS. 1 and 2, by virtue of which, in the manner described in more detail below, undesired rolling away of a mobile working machine built with the drive-train 1 can be avoided in the event of a command to engage a neutral operating condition of the transmission 3 while at the same time the mobile working machine is on an inclined surface.

By means of an actuating element 65 such as a driver's switch, a joystick, a dashboard or the like, a driver of a mobile working machine is enabled to specify a driver's wish to produce an operating condition of the vehicle drive-train, such as forward driving, driving in reverse or a neutral operating condition, such that both forward and reverse driving can take place at various driving speeds.

The driver's wish expressed by means of such an actuating element 65 is read in by a first module 67 of a control software system 66. Then, the environmental conditions of the mobile working machine are determined by means of an inclination sensor, such as an acceleration sensor, a rotary speed sensor or a combination of these sensors. During this it is determined by a second module 68 of the control software system 66 whether the mobile working machine is, for example, on an inclined surface.

If the mobile working machine is on an incline, then during a further step it is decided whether, if the production of a neutral operating condition has been commanded, not all the clutches of the transmission 3, i.e. not all the reversing and range clutches 5A, 5B, 29, 34 are open, but only the reversing clutches 5A and 5B. This decision is made by a third module 69. Depending on the decision reached by the third module 69, by means of a fourth module 70 the control software 66 generates control commands for the reversing clutches 5A, 5B, the variator 8 and the range clutches 29, 34.

Figure 5:
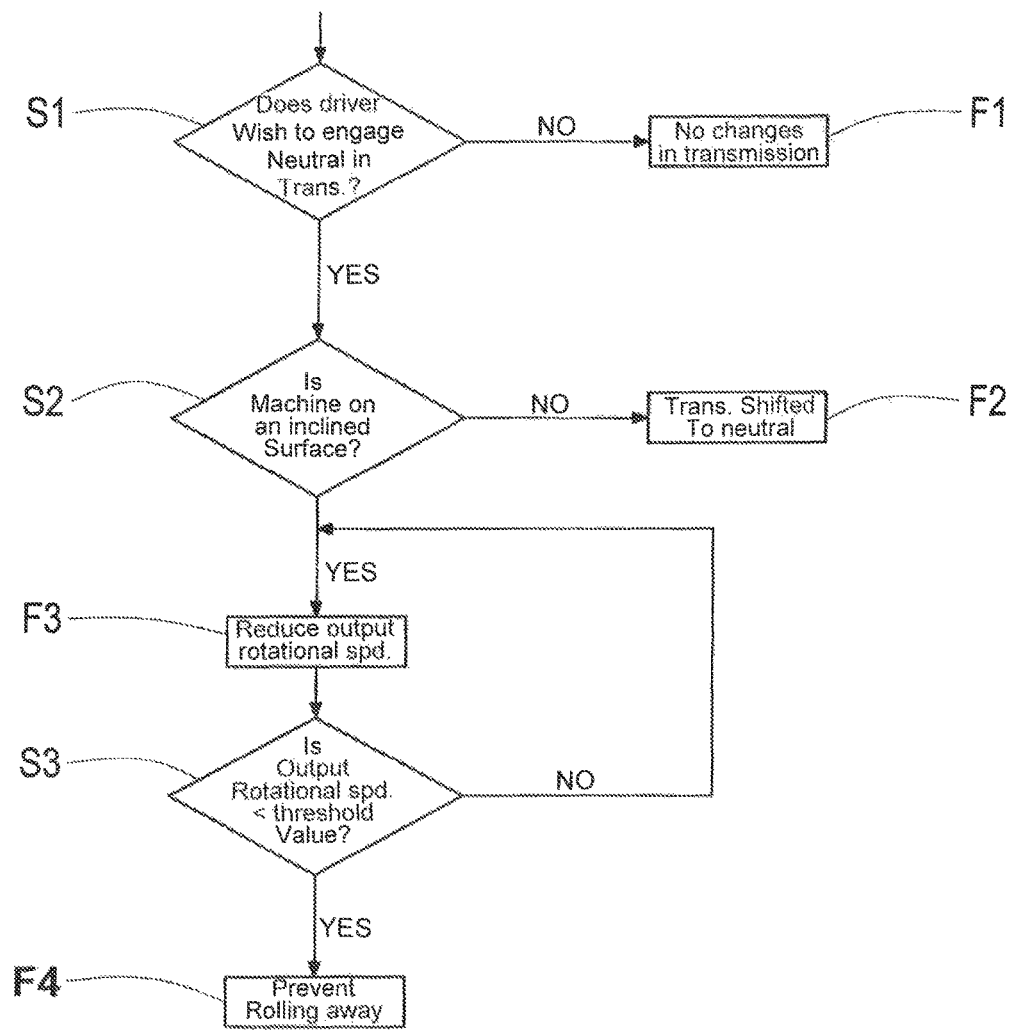
FIG. 5: A flow-chart of a first variant of the method according to the invention.

FIG. 5 shows a flow diagram for a first variant of the procedure based on the functional sequence plan according to FIG. 4 for avoiding rolling away of a mobile working machine if it is recognized to be on an inclined surface.

During a first checking step S1 it is checked whether the driver has expressed a wish to engage the neutral operating condition of the transmission 3. If the result of this inquiry in the first checking step S1 is negative, the sequence branches off to a functional block F1 and the vehicle drive-train 1 is left in its current operating condition. If the result of the inquiry in the first checking step is positive, the sequence branches off to a further checking step S2 in which it is checked whether or not the mobile working machine is on an inclined surface. If the result of this inquiry in the second checking step S2 is negative, the sequence branches off to a second functional block F2 and the reversing clutches 5A, 5B of the reversing gear unit 5 and also the range clutches 29, 34 of the range group 7 are both opened immediately, so that the vehicle drive-train 1 is in its neutral operating condition and in the area of the reversing gear unit the drive engine 2 is disconnected from the drive output 4. In addition the drive output 4 is also decoupled from the variator 8 by the open range group 7, and can therefore rotate freely.

Otherwise than as above, if the result of the inquiry in checking step S2 is positive, the sequence branches off to a third functional block F3 and the variator 8 is swiveled, or its transmission ratio is adjusted, in such manner that the rotational speed of the drive output 4 is reduced toward zero.

Owing to the adjustment of the variator 8 carried out during the third functional block F3, in a third checking step S3 it is checked cyclically whether the rotational speed of the drive output 4 is lower than a defined threshold value which is preferably at least substantially close to zero. If the result of the inquiry in the third checking step S3 is negative, the sequence branches back to before the third functional block F3 and the variator 8 is adjusted further. On the other hand, if during the third checking step S3 it is found that the rotational speed of the drive output 4 is lower than the defined threshold value, the sequence branches off to a fourth functional block F4 in which the reversing clutches 5A and 5B are opened immediately whereas the range clutch 29 is kept in its closed operating condition in order to keep the drive output 4 rotationally fixed to the variator 8 and avoid an undesired rolling away of the mobile working machine on an inclined surface.

Figure 6:
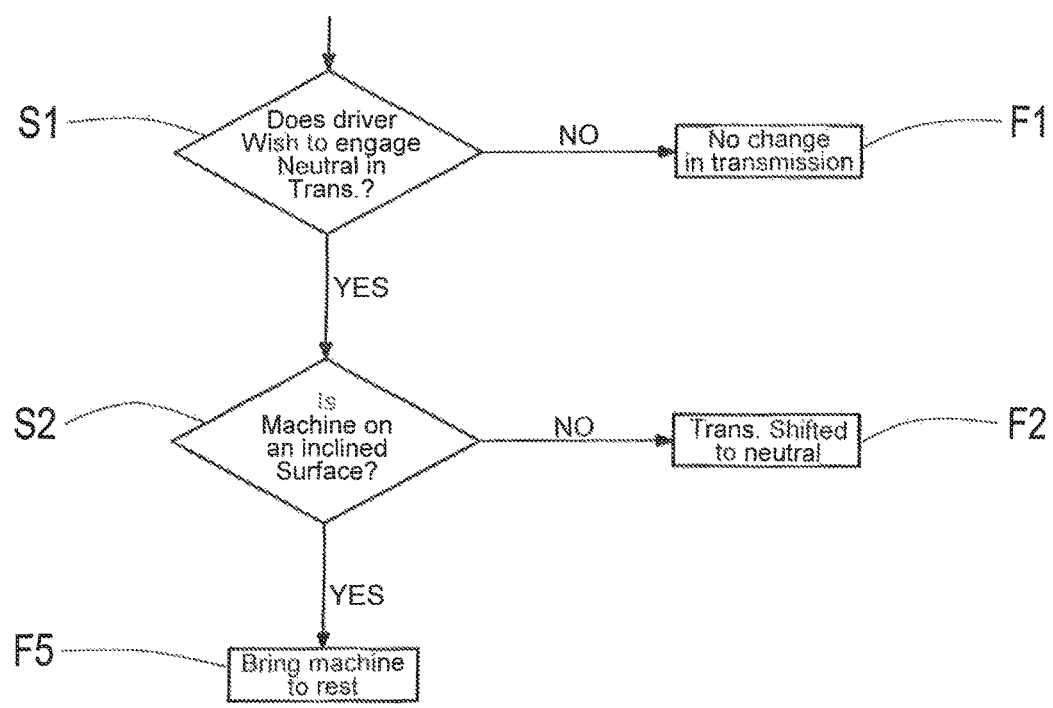
FIG. 6: A flow-chart of a second variant of the method according to the invention.

FIG. 6 shows a flow diagram of a second variant of the procedure described in relation to FIG. 4, which comprises the steps to be carried out identically to the two checking steps S1 and S2 and during the two functional blocks F1 and F2 shown in FIG. 5. Otherwise than in the first variant described by FIG. 5, in this second variant, when the result of the inquiry in the second checking step S2 is positive the sequence branches off to a fifth functional block F5 in which the reversing clutches 5A and 5B are opened immediately whereas the range clutch 29 is kept in its closed operating condition. In addition, already during the process of opening the reversing clutches 5A and 5B the rotational speed of the drive output 4 is reduced toward zero by appropriate adjustment or swiveling of the variator 8. This means that in this second variant according to FIG. 6 the reversing clutches 5A and 5B are opened immediately and only after that is the variator 8 swiveled to the position required for bringing the vehicle to rest.

The first variant of the procedure according to FIG. 4 described in FIG. 5, compared with the second variant described in FIG. 6, has the advantage that by virtue of the coupling of the drive engine 2 with the drive output 4 until the vehicle comes to rest, loads due to high rotational speeds in the area of the variator 8 are avoided in a simple manner.

INDEXES

1 Vehicle drive-train
2 Drive engine
3 Transmission
4 Drive output
5 Reversing gear unit
5A, 5B Reversing clutch
6 Planetary gearset
7 Range group
8 Variator, hydrostat unit
9 Drivable vehicle axle
10 Transmission input shaft
11 Fixed wheel
12 Fixed wheel
13 Auxiliary power take-off
14 Loose wheel
15 Loose wheel
16 Planetary carrier
17 Loose wheel
18 Double planetary wheels
19 First sun gear
20 Second sun gear
21 Ring gear
22 Shaft
23 First hydraulic machine
25 Fixed wheel
26 Fixed wheel
27 Shaft
28 Second hydraulic machine
29 Frictional shifting element
30 Loose wheel
31 Fixed wheel
32 Fixed wheel
33 Fixed wheel
34 Frictional shifting element
35 Loose wheel
36 Fixed wheel
36A Fixed wheel
37 Transmission output shaft
38 Adjustable yoke
39, 40 Axis
50 Shaft
60 Control unit
61 Microcomputer
62 Output stage
65 Operating element
66 Control software
67 First module
68 Second module
69 Third module
S1 to S3 Checking step
F1 to F5 Functional block

The invention claimed is:

1. A method of operating a vehicle drive-train (1) having a continuously power-branched transmission (3) with secondary coupling, which includes a reversing gear unit (5), a planetary gearset (6), a range group (7) and a variator (8), such that by reversing clutches (5A, 5B) of the reversing gear unit (5), a rotational direction of the transmission (3) are set and a power flow between the transmission (3) and a drive engine (2) are established, while in the planetary gearset (6), torque produced by the drive engine (2) is applied in an area of a drive output (4) of the vehicle drive-train (1) connected to the transmission (3) by a first power path and a second power path including the variator (8) and by range clutches (29, 34) of the range group (7), and torque applied in the area of the drive output (4) in a disengaged operating condition of the reversing clutches (5A, 5B) of the reversing gear unit (5) by way of the range group (7), when power flow between the drive output (4) and the variator (8) is established in the range group (7) by the range clutches (29, 34), is assisted in an area of the variator (8), the method comprising:

checking whether a vehicle, having the vehicle drive-train (1), is on an inclined surface when a command is issued to interrupt the power flow in the vehicle drive-train (1) between the drive engine (2) and the drive output (4), and interrupting the power flow at a latest when a rotational speed of the drive output equal to zero is reached by disengaging the reversing clutches (5A, 5B), while maintaining an active connection between the drive output (4) and the variator (8) by the range group (7), if the vehicle is on the inclined surface.

2. The method according to claim 1, further comprising adjusting a transmission ratio of the variator (8), if the vehicle is on the inclined surface, to displace the rotational speed of the drive output (4) toward zero when power flow between the drive engine (2) and the drive output (4) exists, and interrupting the power flow between the drive engine (2) and the drive output (4), if the rotational speed of the drive output (4) is lower than a defined threshold value by actuating the reversing clutches (5A, 5B) of the reversing gear unit (5), while maintaining the power flow between the variator (8) and the drive output (4) by the range group (7).

3. The method according to claim 2, further comprising adjusting the transmission ratio of the variator (8) at least until the rotational speed of the drive output (4) is lower than the threshold value.

4. The method according to claim 2, further comprising defining the threshold value of the rotational speed of the drive output (4) as being at least approximately equal to zero.

5. The method according to claim 1, further comprising interrupting the power flow between the drive engine (2) and the drive output (4) by actuating the reversing clutches (5A, 5B) of the reversing gear unit (5) if the vehicle is on the inclined surface, while displacing the rotational speed of the drive output (4) toward zero by adjusting a transmission ratio of the variator (8) and maintaining the power flow between the variator (8) and the drive output (4) by the range group (7).

6. The method according to claim 1, further comprising interrupting both the power flow between the drive engine (2) and the drive output (4) and also the power flow between the drive output (4) and the variator (8) in the area of the range group (7), if the vehicle is not on the inclined surface.

7. The method according to claim 1, further comprising evaluating signals from an inclination sensor to determine whether the vehicle is on the inclined surface.

8. A method of operating a drive-train (1) of a vehicle having a continuously power-branched transmission (3) with secondary coupling, which includes a planetary gearset (6), a range group (7), a variator (8) and a reversing gear unit (5) having reversing clutches (5A, 5B) which are operable for setting a rotational direction of the transmission (3) and establish a power flow between a drive engine (2) and the transmission (3), and torque produced by a drive engine (2) being transmittable through the planetary gearset (6) by a first power path to range clutches (29, 34) of the range group (7) and the torque that being produced by the drive engine (2) being transmittable through the planetary gearset (6) by a second power path, which passes through the variator (8), to the range clutches (29, 34) of the range group (7), and from the range clutches (29, 34) of the range group (7) the torque being applied to a drive output (4) of the vehicle drive-train (1) connected to the transmission (3), and the torque applied to the drive output (4), in a disengaged operating condition of the reversing clutches (5A, 5B) of the reversing gear unit (5) by way of the range group (7), when in the range group (7) by way of the range clutches (29, 34) power flow between the drive output (4) and the variator (8) is established, can be assisted in an area of the variator (8), the method comprising:

determining whether a signal is issued by a driver to interrupt the power flow in the vehicle drive-train (1) between the drive engine (2) and the drive output (4);

determining, if the signal to interrupt the power flow in the drive-train between the drive engine and the drive output is issued, whether the vehicle is located on an inclined surface; and interrupting the power flow by disengaging the reversing clutches (5A, 5B) when at a latest a rotational speed of the drive output is equal to zero, while maintaining an active connection between the drive output (4) and the variator (8) by way of the range group (7) if the vehicle is located on the inclined surface.

* * * * *